United States Patent [19]

Stanley

[11] Patent Number: 5,785,329
[45] Date of Patent: Jul. 28, 1998

[54] CART FOR DRAINING OIL AND OTHER LIQUIDS FROM A VEHICLE

[76] Inventor: Douglas G. Stanley, 507 Timberline Rd., Bullard, Tex. 75757

[21] Appl. No.: 901,159

[22] Filed: Jul. 28, 1997

[51] Int. Cl.$^6$ .................................................. B62B 3/02
[52] U.S. Cl. .................... 280/79.5; 280/79.5; 280/47.34; 280/47.35; 280/47.26; 141/88; 141/98
[58] Field of Search .................... 280/79.5, 47.34, 280/47.35, 47.26; 141/88, 98, 130, 729, 131, 331, 332, 337, 340, 368; 138/119, 120; 422/82.05

[56] References Cited

U.S. PATENT DOCUMENTS 5,375,862  12/1994  Sirianno ........................... 280/79.5

*Primary Examiner*—Gary C. Hoge
*Assistant Examiner*—Clovia Hamilton
*Attorney, Agent, or Firm*—John W. Adee

[57] ABSTRACT

There is disclosed a cart for draining oil and other liquids from a vehicle. The cart has a wheeled support which carries a funnel shaped receiver. The funnel can be moved upward to near a vehicle while a funnel guide can be moved downward into an opening in a closed container. Oil or other liquids are therefore prevented from splattering or splashing, thereby protecting the enviroment.

9 Claims, 4 Drawing Sheets

CART FOR DRAINING OIL AND OTHER LIQUIDS FROM A VEHICLE

FIELD OF THE INVENTION

This invention relates to a cart assembly used to drain liquids, including oils and radiator liquids, from a vehicle in an environmentally safe manner.

BACKGROUND OF THE INVENTION

Society can no longer tolerate oil spills, even small oil spills such as splatter from draining motor oil from a vehicle, as this oil can eventually find it's way to streams and ground water making them unfit for human consumption.

Many large shops have installed vacuum systems and other closed systems to drain liquids from a vehicle. These systems are very expensive and are not feasible for the many thousands of small shops. These small shops must rely on manually operated equipment which is portable. One example of a manual system which is designed to prevent oil spill is disclosed in U.S. Pat. No. 4,030,602. This patent discloses the use of plural containers which are sealed after the oil is drained. However this apparatus is designed to set on the floor and is not adjustable for the varying distances from the vehicle. While it is much better than draining into an open pan, it is subject to some splattering and is inconvenient to place and remove from the vehicle.

Another portable device is disclosed in U.S. Pat. No. 5,375,862 which discloses a portable apparatus which can be moved into place to drain oil from a vehicle. There is an adjustable funnel which allows the funnel to be placed near the vehicle. This can prevent spilling or splattering from the vehicle. However the funnel drains into an open bucket which allows splattering and the further the funnel is moved upward, the greater the splattering would be. Since the funnel spout can not be lowered without lowering the funnel it would be difficult to drain into a closed container. Also the frame of this apparatus surrounds the apparatus. This would be a disadvantage in moving the apparatus around a shop as shops have a tendency to become crowed with equipment. While this apparatus serves a need for a portable device in this field, it does not solved certain environmental requirements.

There is a need for a portable device for draining liquids from vehicles which is portable and meets the requirements for a easily used article which also protects the environment and meets environmental requirements for the small shops.

SUMMARY OF THE INVENTION

The present invention is directed to a portable apparatus means for draining liquids such as motor oil, transmission oil and liquid drained from vehicle radiators, such as antifreeze liquid. The vehicles include but is not limited to automobiles, trucks, tractors and stationary engines.

The apparatus comprises a rigid frame means which is made portable by the use of such means as wheels, rollers, casters or other movable support means such as skids fastened on the bottom of the frame means. The frame means includes an upright member with a lower lateral member and an upper lateral member attached thereto. Further the lower lateral member has a cross member attached thereto. Extensions means are fastened to each end of the lower lateral cross member to form a holder for a container means. The upper lateral member has a support guide means for a funnel shaped receiver means fastened to the end opposite the upright support attachment point to the upper lateral member. The support guide means is hollow to receive a funnel guide means. The funnel guide means in turn receives a funnel pipe means. A first means wich may be a set screw is provided for holding the funnel guide means in place in relation to the support guide means and a second means which also may be a set screw holds the funnel guide means in place in relation to the funnel pipe means.

DETAILED DESCRIPTION OF THE PREFERRED EMBODIMENT OF THE INVENTION

Figure 1:
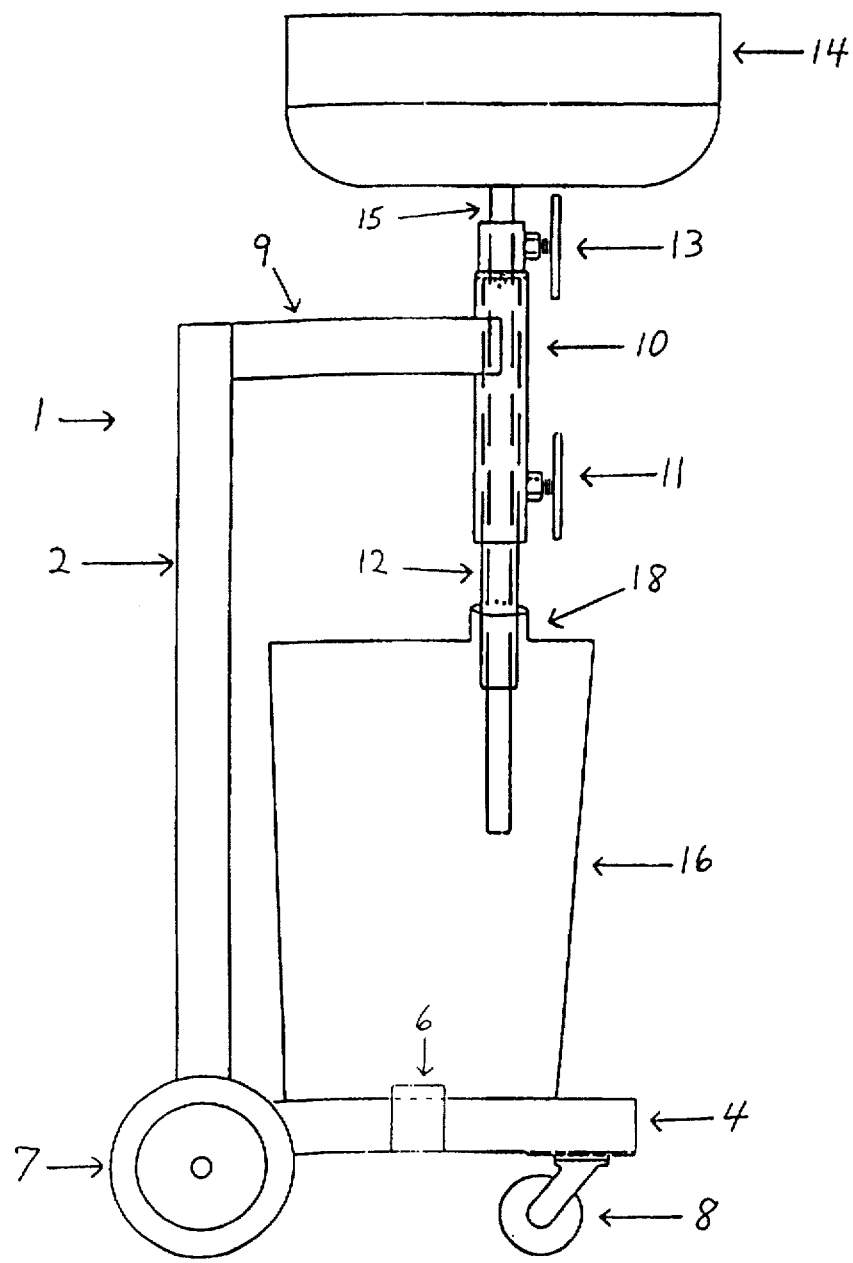
FIG. 1 discloses a side view of the oil drain cart showing a drain bucket in place.
Figure 2:
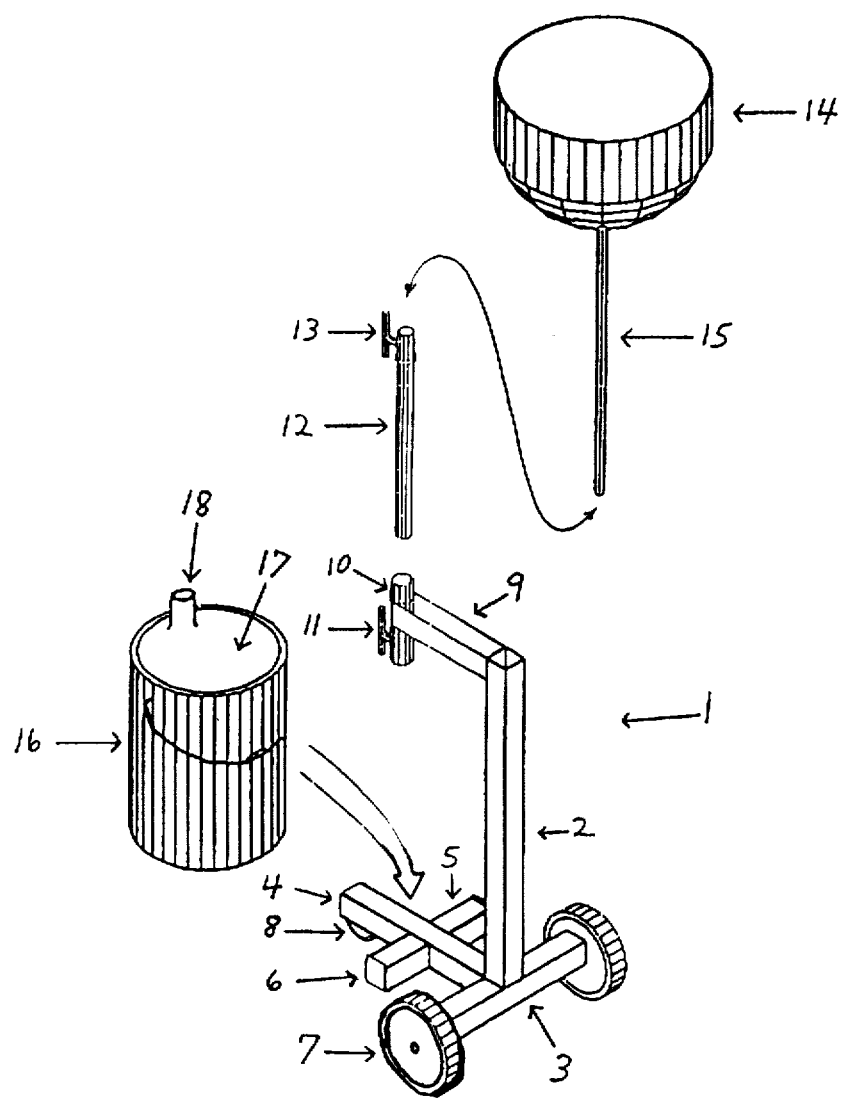
FIG. 2 discloses a perspective view of the oil drain cart showing the relationship of the parts.
Figure 3:
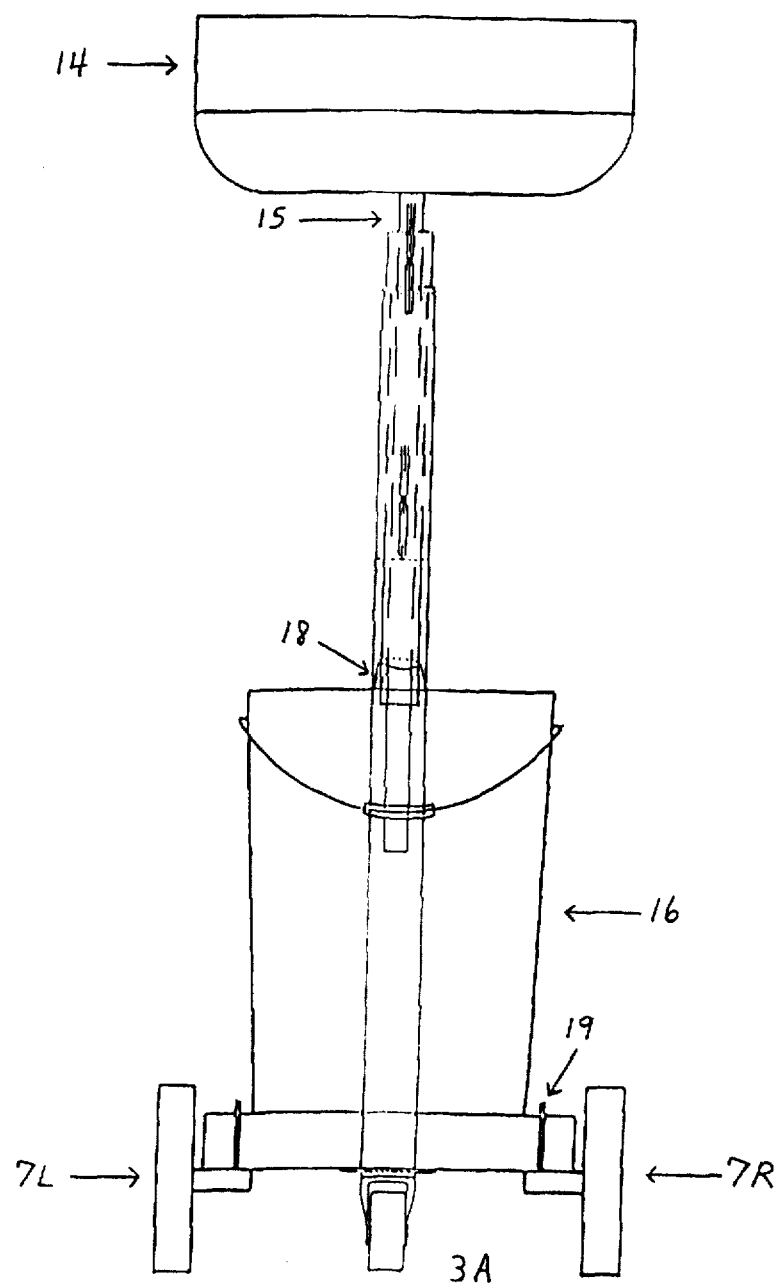
FIG. 3 discloses a rear view of the oil drain view showing an alternative view of the axle.
Figure 4:
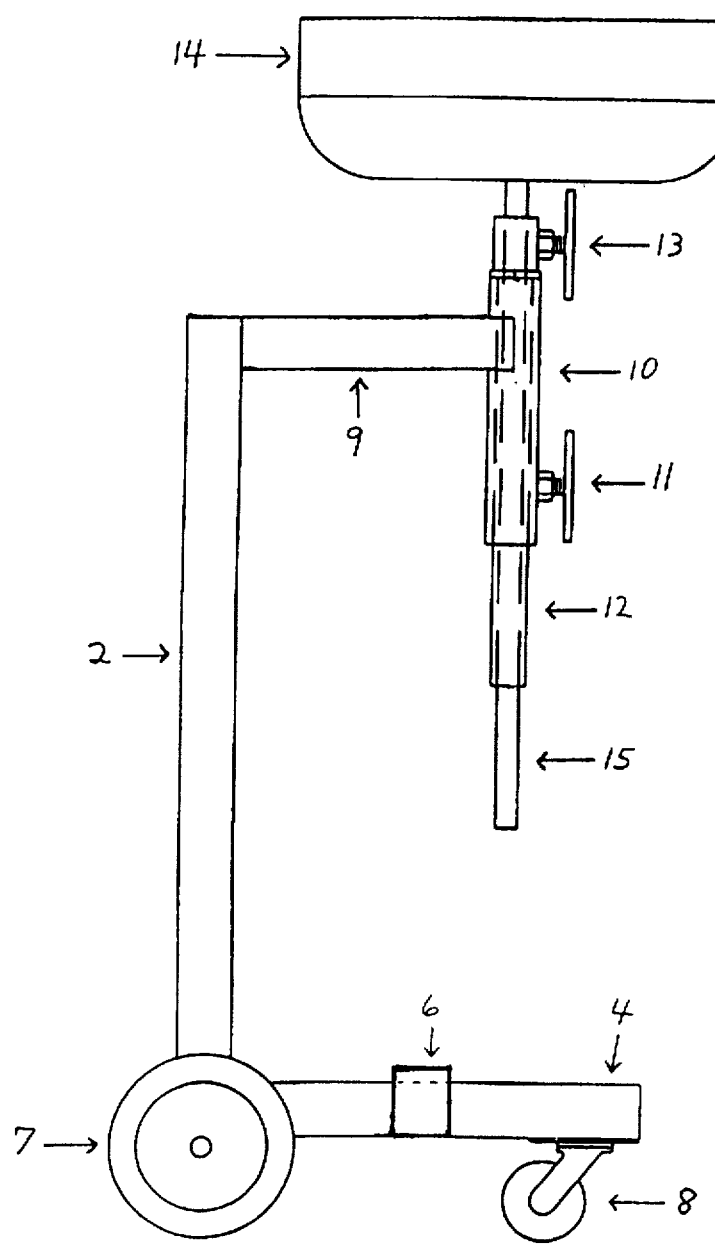
FIG. 4 discloses a side view of the oil drain cart of FIG. 1 but without the drain bucket in place.

The present invention is illustrated in the accompanying drawings FIGS. 1 through 4. An oil drain cart illustrated generally at 1 has a support made up of an upright support member 2 fastened to an axle member 3 shown in FIG. 2 or alternatively as 3A in FIG. 3, a lower lateral support member 4 which carries a cross member 5, is fastened to the axle 3 or 3A at a point near the upright support 2 as clearly shown in FIG. 2. Wheels 7 are fastened to each end of the axle 3 or the wheels designated 7L and 7R are fastened below the axle 3A using a clamp 19 as shown in FIG. 3. This produces additional clearance at the centre section of the oil drain cart. A caster 8 is fastened near the front of the lateral support member 4. Bucket stops 6 are fastened to the ends of the cross member 5. An upper lateral support member 9 is fastened to the side of the upright member 2 and at the upper end of the upright member. The upright support member, the lower lateral support member including the cross member the upper lateral support member and the axle are preferably made of hollow tubing. The tubing can be either metal or plastic. The inventor prefers 2 inch square metal tubing but smaller or larger tubing may be desirable for special uses. For example for large tractors which hold several gallons of liquids it could be more practical to use up to six inch tubing in order to support the weight of the liquid. Also solid bars could be used when extra strength is desired. Lumber could also be used with either 2" by 4" or 4"by 4" being suitable. Round tubing could also be used but is less practical than square tubing since the joints would need to be precisely formed.

The preferred method of fastening the tubing is welding when either metal or plastic tubes are used but the plastic members could be glued or cemented together using cements or glues common to the plumbing trade. Also bolts especially bolts and flanges could be used.

A support guide 10 is fastened to the upper lateral support member at the end opposite where the upper lateral support joins the upright support. The support guide 10 is preferably a round hollow tube. A funnel guide tube 12 is sized to fit snugly but slideable into and through the support guide tube 10. A support guide set screw 11 when open allows the funnel guide 12 to slide within the support guide 10 and when closed holds the funnel guide 12 firmly in place in the support guide 10. A funnel 14, as shown in the 4 figures, has a funnel drain pipe 15 attached to its bottom section. It is preferred the opening from the funnel into the funnel drain pipe be sufficiently small that a drain plug will not fall through the opening but large enough so the liquid being drained flows freely. The inventor has found a ½" opening is suitable in most instances. The funnel drain pipe 15 fits snugly but slides freely through the funnel guide 12. A funnel guide set screw 13 is provided near the top of the funnel guide 12. The funnel guide screw 13, when closed, holds the funnel drain pipe 15 firmly in place in relation to the funnel guide 12. When using a funnel drain pipe with a ½" opening, a funnel guide tube with a 1" opening and a support guide with a 1 ¼ opening have been found suitable sizes for use with this invention. It should be understood that it is not necessary for the funnel drain pipe 15 to extend through the funnel guide 12. All that is necessary is for the funnel drain pipe 15 to extend past the funnel guide set screw 13 as will be explained later. A drain bucket 16 is illustrated in place in FIGS. 1 and 3 and as removed in FIG. 2. The drain bucket 16 is held in place by bucket stops 6. Any closed container with a closeable spout and having sufficient capacity to hold at least one drain of liquid from a vehicle, such as those sold in hardware stores for containing gasoline or oil are suitable for use with this invention. However the inventor prefers the illustrated container 16 which has a flat top 17 and a closeable spout 18. The flat top is useful for holding such items as wrenches, drain plugs and wipe cloths. The capacity is preferably at least 5 gallon but no more than 10 gallons. However smaller or larger containers could obviously be used as long as the smaller capacity container has sufficient capacity to accommodate the liquid being drained.

In operation the drain cart, with the drain bucket in place, is placed under the vehicle which is usually on a lift of some type. The support guide set screw 11 is opened and the funnel guide tube 12 is placed within the spout 18 of the drain bucket 16. The support guide set screw 11 is then closed. The funnel guide set screw is opened and the funnel is moved near the vehicle drain but far enough away so the drain plug (not shown) can be removed. After the drain plug is removed, the funnel 14 is moved close to the vehicle drain by sliding the funnel drain pipe 15 upward then the funnel guide set screw 13 is tightened. Thus a closed system is formed from the funnel into the can.

After the oil or other liquid has drained the funnel is lowered and the oil drain cart is removed from under the vehicle. The funnel guide tube 12 and the funnel drain pipe are then raised above the drain bucket and the bucket is sealed. A drain bucket may be used two or more times if it has sufficient capacity. Usually different buckets will be used for different liquids. The shop may have storage tanks into which the drained liquids are placed for later disposal or the drain buckets may be transported directly to a recycle plant.

It is obvious that by using the disclosed apparatus and method, no liquid will drain or splatter thus protecting the environment.

While the description above contains many specificity's, these should not be construed as limiting the scope of the invention but as merely providing illustrations of some of the presently preferred embodiments of this invention.

Thus the scope of the invention should be determined by the appended claims and their legal equivalents rather than by the given examples.

I claim:

1. An apparatus for draining liquids from a vehicle comprising a receiver means for receiving liquid from the vehicle, a tube attached to said receiver means, a hollow shaft surrounding said tube, said tube being slidable within said shaft and a means on said shaft for holding said tube in a fixed position, a hollow conduit surrounding said shaft, said shaft being slidable in said conduit, means on said conduit for holding said shaft in a fixed position in relation to said conduit, said conduit being attached to a movable cart means; whereby said receiver may be raised to fit close to said vehicle and said shaft may be lowered into a closed container.

2. The apparatus of claim 1 wherein said movable cart means has a support member, said support member having one end connected to said conduit and a second end connected to one end of a second support, said second support being substantially perpendicular to said first support, said second support is connected at its second end to a platform for holding the container.

3. The apparatus of claim 2 further including wheel means fastened to said platform to aid in moving said apparatus.

4. The apparatus of claim 2 further including a means on said platform for holding said container in place.

5. A cart for draining liquid from a vehicle said cart including an axle, an upright support fastened to said axle, a lower lateral support fastened to said axle, a cross member fastened to said lower lateral support, an upper lateral support fastened to said upright support, a support guide fastened to said upper lateral support, a funnel guide sized to fit within said support guide, a funnel having a pipe sized to fit within said funnel guide, a first means on said support guide and a second means on said funnel guide for holding said funnel guide and said funnel pipe in place, whereby said funnel can be raised and said funnel guide can be lowered so the liquid may be drained into a spout of a closed container.

6. The cart for draining liquid of claim 5 further including bucket stops on said cross member for holding a container.

7. The cart for draining liquid as claimed in claim 5 further including wheels fastened to said axle.

8. The cart for draining liquid as claimed in claim 5 further having a bucket on said cross member, said bucket having having a closed top with a sealable opening, said opening being sized to receive said funnel guide.

9. The cart for draining liquid as claimed in claim 8 further including said top having a flat surface.

\* \* \* \* \*